June 27, 1939.      M. SAINICH      2,163,738

LOCOMOTIVE AND CAR WHEEL TIRE SHAPING TOOL

Filed July 29, 1938      2 Sheets-Sheet 1

Inventor

Martin Sainich

By Clarence A. O'Brien
and Hyman Berman
Attorneys

June 27, 1939. M. SAINICH 2,163,738

LOCOMOTIVE AND CAR WHEEL TIRE SHAPING TOOL

Filed July 29, 1938  2 Sheets-Sheet 2

Inventor

Martin Sainich

By Clarence A. O'Brien
and Hyman Berman
Attorneys

Patented June 27, 1939

2,163,738

UNITED STATES PATENT OFFICE 2,163,738

LOCOMOTIVE AND CAR WHEEL TIRE SHAPING TOOL

Martin Sainich, Livingston, Mont.

Application July 29, 1938, Serial No. 222,048

4 Claims. (Cl. 82—36)

This invention relates to tools and a holder therefor especially adapted for cutting locomotive and other types of railroad rolling stock metallic wheel tires, and has for the primary object the provision of a device of this character which will simplify the shaping of car wheel tires and permit the work to be easily and accurately carried out on a lathe with a less number of tools than heretofore employed and which will provide a tool for cutting the flange and a portion of the tread of the tire and a second tool for cutting the remaining portion of the tread of the tire and providing the desired taper thereto and when in the act of cutting the tread will overlap the portion of the tread acted on by the first-mentioned tool so that the finished tread will be accurately formed to a determined measurement free of any irregularities.

With these and other objects in view, the invention consists in certain novel features of construction, combination and arrangement of parts to be hereinafter more fully described and claimed.

For a complete understanding of my invention, reference is to be had to the following description and accompanying drawings, in which.

Figure 1:
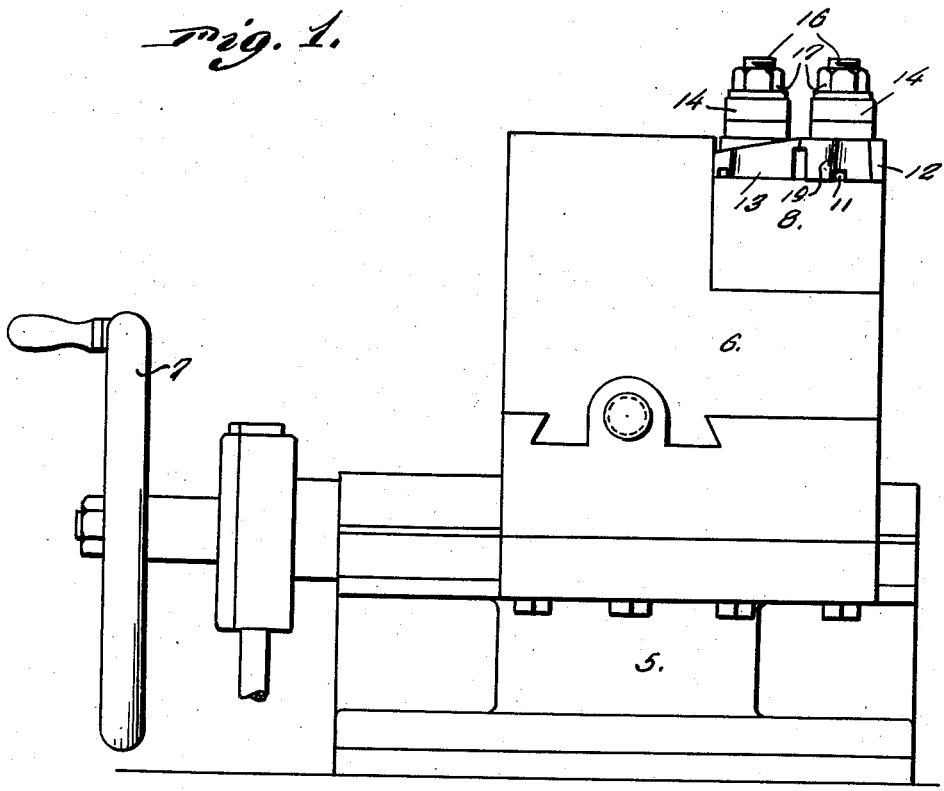
Figure 1 is a fragmentary elevational view showing a portion of a lathe with the present invention mounted thereon.
Figure 2:
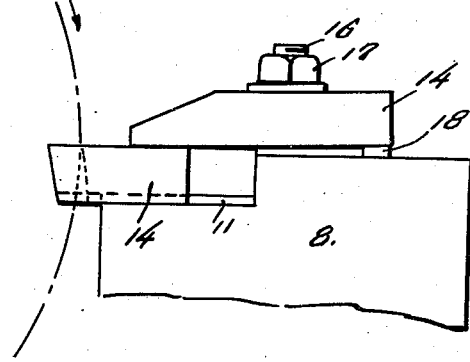
Figure 2 is a fragmentary side elevation showing one of the tools in the act of cutting the flange and a portion of the tread of a locomotive wheel tire.

Referring in detail to the drawings, the numeral 5 indicates a fragmentary portion of a lathe and that portion which provides a carriage for the cutting tool, the carriage being indicated by the character 6 and adjustable longitudinally with respect to the work and the bed or base of the lathe through a conventional operating means, indicated by the character 7. The carriage 6 has a cutaway portion forming a seat for the reception of the present invention which includes a base 8 arranged on the seat and suitably secured in the recess by means (not shown) so as to move with the carriage towards and from the work. The top face of the base 8 is cut away to form a tool seat 9 on which are secured spaced ribs or guides 10 slidably received in grooves 11 formed in the under faces of tools 12 and 13. These tools are slidable or adjustable longitudinally of the base 8 and are held in their adjusted position by clamps 14. The clamps 14 engage the top faces of the tools 12 and 13 and force them tightly against the seat 9. The clamps have elongated slots 15 through which extend bolts 16 carried by the base 8. Nuts 17 are threaded on the bolts 16 and bear against the clamps for forcing them tightly upon the tools 12 and 13. The tools are prevented from shifting transversely of the base 8 by the ribs 10 fitting in the grooves in the under faces of the tools. Shims 18 may be arranged under the rear end of the clamps, as shown in Figure 2.

The tool 12 has a cutting edge 19 shaped for cutting the tire flange of the wheel and a portion of the tread with a proper taper thereto extending away from the flange. The tool 13 has a cutting edge 20 shaped to cut the remaining portion of the tread with the desired taper and finish the edge of the tread remote from the flange with the usual required curvature, as indicated by the character A.

Figure 3:
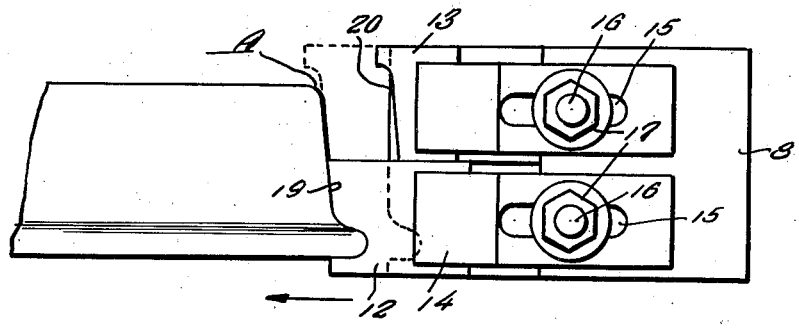
Figure 3 is a fragmentary top plan view showing the tools and their various adjusted positions relative to the tread of the tire and with one of the tools in active cutting postion for cutting the flange and a portion of the tread of the tire.
Figure 4:
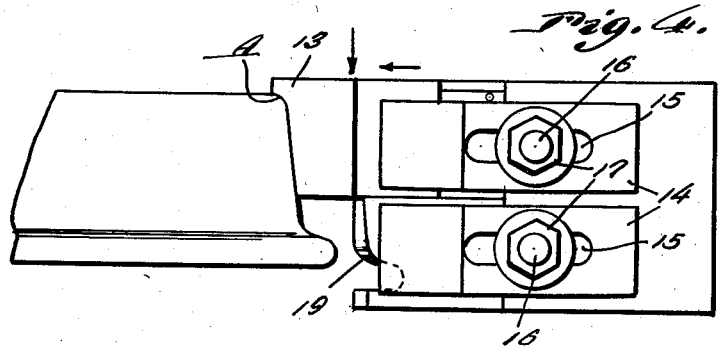
Figure 4 is a view similar to Figure 3 showing the other tool adjusted into active cutting position for cutting the remaining portion of the tread and providing the desired tapered edge to said tread.
Figure 5:
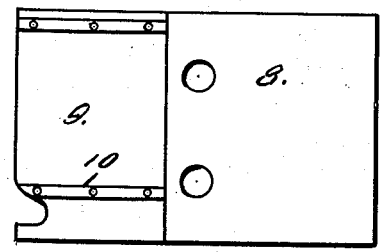
Figure 5 is a plan view illustrating a mounting for the tools.

In use, it is preferable that the present invention be employed upon a lathe or tool holder of the character set forth in the United States Patent 1,571,322 with slight modification thereto. In a tool holder as shown in said patent, the carriage thereof is capable of adjustment longitudinally and transversely with respect to the work so that when the present invention is employed on the carriage one tool, namely the tool 12, may be readily brought into cutting position for forming the flange and a portion of the tread of the tire. This is shown in Figure 3, while the tool 13 is adjusted so as to be a selected distance away from the tread of the tire during the cutting operation by the tool 12. After the flange and a portion of the tread has been cut by the tool 12 the latter is adjusted rearwardly on the base into an inactive or inoperative position and the tool 13 is brought forward to an active or operative position whereby the remaining portion of the tread of the tire may be cut. When the tool 13 is brought into operative position and the tool 12 positioned rearwardly or in the inactive position, the carriage is shifted transversely with respect to the work so that the tool 13 will have an overlapping cut with the portion of the tread of the tire acted on by the tool 12, consequently when the tread of the tire has been completely finished it will be free of irregularities and will have the desired taper to the tread extending from the flange towards the non-flanged edge and with the latter edge rounded as usual. Through the use of the present invention on the lathe the cutting of a wheel tire to provide a tread to meet with determined measurements can be easily and quickly and accurately carried out. Through the use of the present invention a less number of tools is employed in the cutting of the tire tread to standard specification.

It is believed that the foregoing description, when taken in connection with the drawings, will fully set forth the construction and advantages of this invention to those skilled in the art to which such a device relates, so that further detailed description will not be required.

Having thus described by invention, what I claim is:

1. In combination with a lathe carriage adjustable longitudinally and transversely relative to a car wheel tire mounted on the lathe, a base mounted on said carriage for movement therewith, and cutting tools mounted for longitudinal adjustment on the base and one of said tools having a cutting edge for cutting a tire flange and a portion of the tread of the tire and the other tool having a cutting edge for cutting the remaining portion of the tread of the tire, said cutting edges coacting to cut the tread with a determined taper thereto with one tool when cutting overlapping a portion of the tread acted on by the other tool.

2. In combination with a lathe having a carriage adjustable longitudinally and transversely thereof and relative to a car wheel tire mounted on said lathe, a base mounted on said carriage for movement therewith and having a seat, cutting tools mounted on said seat for longitudinal adjustment thereof and one of said tools having a cutting edge for cutting a tire flange and a portion of the tread of the tire, and the other tool having a cutting edge for cutting the remaining portion of the tread of the tire, said cutting edges coacting to cut the tread with a determined taper thereto and with a rounded edge located remotely to the tire flange with one tool when cutting overlapping a portion of the tread acted on by the other tool.

3. A tool comprising a base to be mounted on a carriage of a lathe with the latter adjustable longitudinally and transversely with respect to a car wheel tire supported by the lathe, said base having a cutaway portion to form a seat, tool elements resting on said seat and provided with grooves in the under faces thereof, guide ribs formed on the seat and received in the grooves, and means carried by said base for clamping the tool elements on the seat against longitudinal movement of the base.

4. A tool comprising a base to be mounted on a carriage of a lathe with the latter adjustable longitudinally and transversely with respect to a car wheel tire supported by the lathe, said base having a cutaway portion to form a seat, tool elements resting on said seat and provided with grooves in the under faces thereof, guide ribs formed on the seat and received in the grooves, clamps engageable with the top faces of the tool elements and the base and having elongated slots, bolts carried by the base extending through the slots, and nuts threaded on said bolts and bearing against said clamps whereby the tools are releasably secured on the seat for adjustment longitudinally of the base.

MARTIN SAINICH.